US012663122B2

(12) United States Patent
Shao et al.

(10) Patent No.: US 12,663,122 B2
(45) Date of Patent: Jun. 23, 2026

(54) METHODS FOR SMART GAS TERMINAL MANAGEMENT, INTERNET OF THINGS SYSTEMS, AND MEDIA THEREOF

(71) Applicant: CHENGDU QINCHUAN IOT TECHNOLOGY CO., LTD., Chengdu (CN)

(72) Inventors: Zehua Shao, Chengdu (CN); Lei Zhang, Chengdu (CN); Xiaojun Wei, Chengdu (CN); Guanghua Huang, Chengdu (CN); Yong Li, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 818 days.

(21) Appl. No.: 18/151,490

(22) Filed: Jan. 9, 2023

(65) Prior Publication Data

US 2023/0160539 A1 May 25, 2023

(30) Foreign Application Priority Data

Dec. 8, 2022 (CN) ......................... 202211569661.7

(51) Int. Cl.
*F17D 5/00* (2006.01)
*F17D 5/02* (2006.01)

(52) U.S. Cl.
CPC ............... *F17D 5/005* (2013.01); *F17D 5/02* (2013.01)

(58) Field of Classification Search
CPC ............ G05B 15/02; G05B 2219/2642; G05B 13/024; G05B 2219/163; G05B 2219/25168; G08B 21/0423; G08B 21/043; G08B 21/0469; G08B 21/0484; G08B 21/182; G08B 19/00; G08B 13/19613;
(Continued)

(56) References Cited

U.S. PATENT DOCUMENTS 6,950,017 B2 * 9/2005 Smith ................ G08B 21/0469 340/8.1
10,514,669 B1 * 12/2019 Call ........................ G06Q 40/08
(Continued)

FOREIGN PATENT DOCUMENTS

CN 104981963 A 10/2015
CN 106530461 A 3/2017
(Continued)

OTHER PUBLICATIONS

He, Long, Deeply Understand XGBoost Efficient Machine Learning Algorithm and Advanced, China Machine Press, 2020, 14 pages.

*Primary Examiner* — Darrin D Dunn
(74) *Attorney, Agent, or Firm* — METIS IP LLC

(57) ABSTRACT

The present disclosure provides a method for smart gas terminal management, an Internet of Things system, and a medium thereof. The method is performed by a smart gas device management platform of the Internet of Things system for smart gas terminal management. The method comprises: obtaining user data authorized for usage by a user, wherein the user data includes at least one of gas information, water usage information, electricity usage information, and network information; determining, based on the user data, residence information of the user; and determining, based on the residence information, a smart gas terminal management solution.

17 Claims, 6 Drawing Sheets

100

(58) Field of Classification Search
CPC .... G08B 21/02; G08B 21/0202; G08B 21/14; G08B 21/16; G08B 21/18; G08B 21/12; G08B 25/00; G16H 40/67; G16H 50/20; G16H 40/20; G16H 50/70; G06Q 40/08; G06Q 50/06; G06Q 10/04; Y02B 20/40
See application file for complete search history.

(56) References Cited

U.S. PATENT DOCUMENTS

| | | | | |
|---|---|---|---|---|
| 11,079,244 | B2 * | 8/2021 | Sun | G08G 1/0129 |
| 11,080,617 | B1 * | 8/2021 | Bansal | G06N 20/20 |
| 11,553,320 | B1 * | 1/2023 | Hutz | G08B 17/00 |
| 2005/0171645 | A1 * | 8/2005 | Oswald | G05B 15/02 700/29 |
| 2010/0307600 | A1 * | 12/2010 | Crucs | E03B 7/071 137/486 |
| 2011/0012738 | A1 * | 1/2011 | Nakamura | G06Q 10/06 137/551 |
| 2012/0315918 | A1 * | 12/2012 | Kadous | H04W 4/021 455/456.1 |
| 2012/0326884 | A1 * | 12/2012 | Cornwall | F17D 3/01 340/870.02 |
| 2013/0073094 | A1 * | 3/2013 | Knapton | G05B 13/02 700/278 |
| 2013/0257626 | A1 * | 10/2013 | Masli | G08B 13/19613 340/691.6 |
| 2014/0129160 | A1 * | 5/2014 | Tran | G01W 1/00 702/61 |
| 2014/0310075 | A1 * | 10/2014 | Ricci | G01C 21/26 705/13 |
| 2015/0309483 | A1 * | 10/2015 | Lyman | G05B 13/02 700/275 |
| 2015/0370272 | A1 * | 12/2015 | Reddy | G05B 17/02 700/278 |
| 2016/0189532 | A1 * | 6/2016 | Malhotra | G08B 29/185 340/506 |
| 2018/0202686 | A1 * | 7/2018 | Ahuja | F24F 11/62 |
| 2018/0365957 | A1 * | 12/2018 | Wright | G08B 21/043 |
| 2019/0294128 | A1 * | 9/2019 | Delaney | G05B 15/02 |
| 2020/0098471 | A1 * | 3/2020 | Ramakrishnan | G06N 20/00 |
| 2023/0252503 | A1 * | 8/2023 | Gordon | G06N 7/01 705/7.31 |
| 2023/0315135 | A1 * | 10/2023 | Reeder | G05D 23/1904 700/300 |
| 2024/0095579 | A1 * | 3/2024 | Paulraj | G06F 21/6245 |
| 2025/0191452 | A1 * | 6/2025 | Sedouram | G06F 3/04886 |

FOREIGN PATENT DOCUMENTS

| | | | |
|---|---|---|---|
| CN | 106850312 | A | 6/2017 |
| CN | 107065796 | A | 8/2017 |
| CN | 107730130 | A | 2/2018 |
| CN | 109163423 | A | 1/2019 |
| CN | 111753909 | A | 10/2020 |
| CN | 111858625 | A | 10/2020 |
| CN | 112150039 | A | 12/2020 |
| CN | 112561202 | A | 3/2021 |
| CN | 113095962 | A | 7/2021 |
| CN | 113802324 | A | 12/2021 |
| CN | 114004396 | A | 2/2022 |
| CN | 114265322 | A | 4/2022 |
| CN | 114338749 | A | 4/2022 |
| CN | 216161209 | U | 4/2022 |
| CN | 114509954 | A | 5/2022 |
| CN | 115047779 | A | 9/2022 |
| CN | 115049180 | A | 9/2022 |
| CN | 115358432 | A | 11/2022 |
| CN | 115439003 | A | 12/2022 |
| TW | 202001455 | A | 1/2020 |

* cited by examiner

METHODS FOR SMART GAS TERMINAL MANAGEMENT, INTERNET OF THINGS SYSTEMS, AND MEDIA THEREOF

CROSS REFERENCE TO RELATED APPLICATION

This application is claims priory to Chinese patent application No. CN202211569661.7, filed on Dec. 8, 2022, the contents of which are incorporated herein by reference.

TECHNICAL FIELD

The present disclosure relates to the field of gas safety monitoring, and in particular to a method for smart gas terminal management, an Internet of Things system, and a medium thereof.

BACKGROUND

Gas safety is about safety of lives and property of users. Safe gas usage usually requires the users to close a valve in time after using the gas, to close a main valve of a gas meter before going out for a long time, or the like.

Therefore, there is a need to provide a method for smart gas terminal management, an Internet of Things (IoT) system, and a medium that can intelligently manage gas terminals to improve convenience of the users while preventing and reducing gas safety accidents.

SUMMARY

One or more embodiments of this present disclosure provide a method for smart gas terminal management. The method for smart gas terminal management is performed by a smart gas device management platform of an Internet of Things system for smart gas terminal management, the method comprising: obtaining user data authorized for usage by a user, wherein the user data includes at least one of gas information, water usage information, electricity usage information, and network information; determining, based on the user data, residence information of the user; and determining, based on the residence information, a smart gas terminal management solution.

One of the embodiments of this present disclosure provides a Internet of Things system for smart gas terminal management, the Internet of Things system for smart gas terminal management comprises a smart gas user platform, a smart gas service platform, a smart gas sensor network platform, a smart gas object platform, and a smart gas device management platform, wherein the smart gas object platform is used to obtaining user data authorized for usage by a user; the user data includes at least one of gas information, water usage information, electricity usage information, and network information; the smart gas sensor network platform is used to send the user data to the smart gas device management platform; the smart gas device management platform is used to: determine, based on the user data, residence information of the user; and determine, based on the residence information, a smart gas terminal management solution; the smart gas service platform is used to send the smart gas terminal management solution to the smart gas user platform the smart gas user platform is used to interact with the user.

One or more embodiments of the present disclosure provide anon-transitory computer-readable storage medium, comprising a set of instructions, wherein when executed by a processor, a method for smart gas terminal management is implemented.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
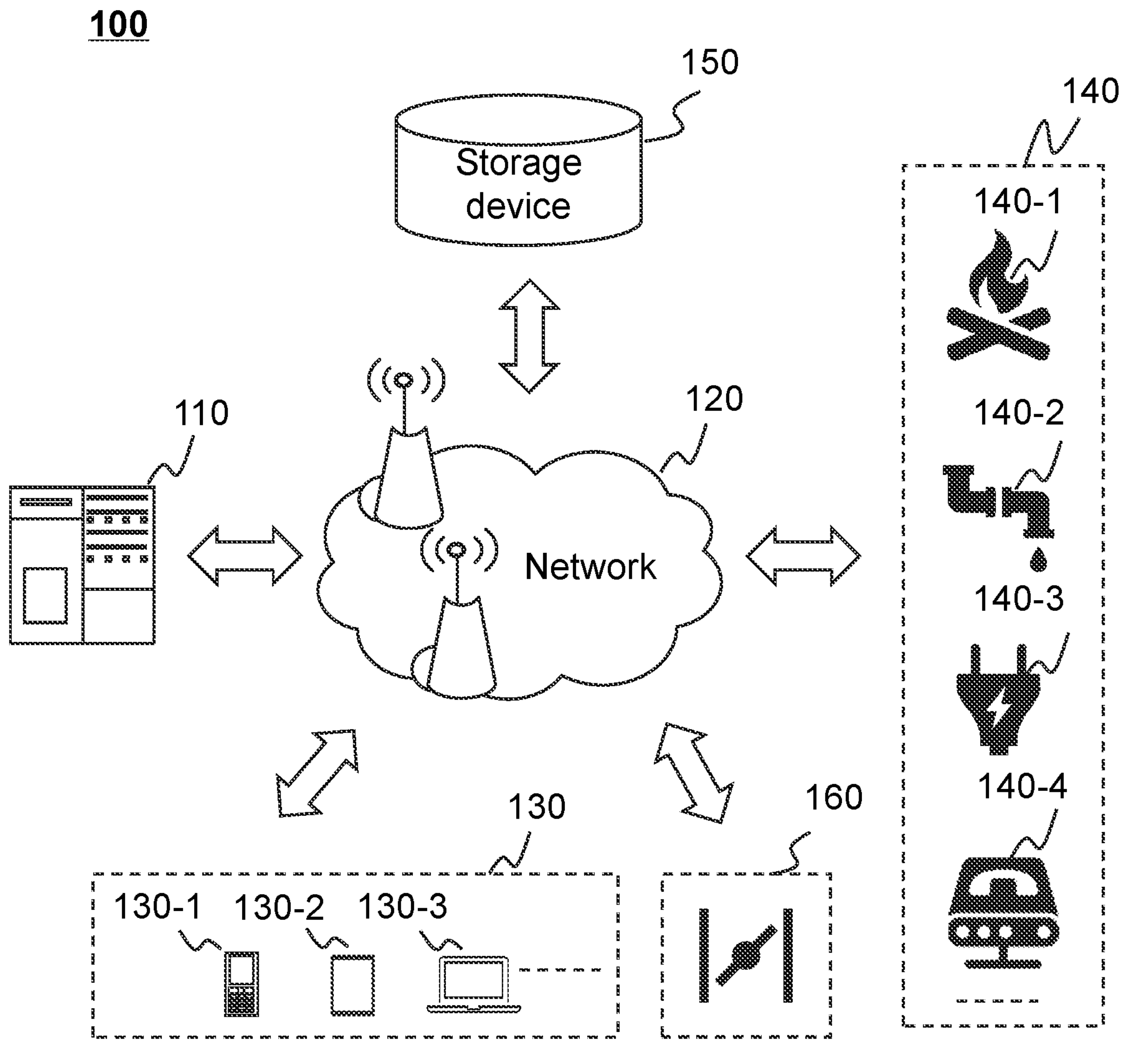
FIG. 1 is a schematic diagram illustrating an application scenario of an Internet of Things system for smart gas terminal management according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the “system”, “device”, “unit”, and/or “module” used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, “a”, “one”, and/or “the” is not specifically singular, and the plural may be included. It will be further understood that the terms “comprise,” “comprises,” and/or “comprising,” “include,” “includes,” and/or “including,” when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating an application scenario of an Internet of Things system for smart gas terminal management according to some embodiments of the present disclosure.

As shown in FIG. 1, the application scenario 100 may include a server 110, a network 120, a terminal device 130, a monitoring device 140, a storage device 150, and a smart gas terminal 160.

In some embodiments, the application scenario 100 may determine a smart gas terminal management solution by implementing the method for smart gas terminal management and/or the Internet of Things system disclosed in the present disclosure. For example, in a typical application scenario, the Internet of Things system for smart gas terminal management may obtain user data authorized for usage by a user through a third-party platform or through the monitoring device 140, wherein the user data includes at least one of gas information, water usage information, electricity usage information, and network information. A processing device may determine, based on the user data, residence information of the user. A smart gas terminal management solution may be determined via the server 110 based on the residence information. For more information about the above process, please refer to FIG. 3 and related descriptions thereof.

The server 110 and the terminal device 130 may be connected via the network 120, and the server 110 may be connected to the storage device 150 via the network 120. The server 110 may include the processing device, and the processing device may be used to perform the method for smart gas terminal management described in some embodiments of the present disclosure.

The network 120 may connect components of the application scenario 100 and/or connect the system to external resource components. The storage device 150 may be used to store data and/or instructions. For example, the storage device 150 may store user data, residence time, housing information, payment information, an opening or closing status of the smart gas terminal, and information related to the smart gas terminal management solution.

The storage device 150 may be directly connected to the server 110 or be inside the server 110. The terminal device 130 may refer to one or more terminal devices or software. In some embodiments, the terminal device 130 may receive the information related to the smart gas terminal management solution sent by the processing device and present the information to the user.

In some embodiments, the terminal device 130 may be used f to input confirmation information related to the smart gas terminal management solution by the user and send the confirmation information to the server 110. Exemplarily, the terminal device 130 may include a mobile device 130-1, a tablet computer 130-2, a laptop computer 130-3, or other devices with input and/or output functions, or the like, or any combination thereof.

The monitoring device 140 may be used to obtain the user data, which includes at least one of gas information, water usage information, electricity usage information, and network information. Exemplary monitoring device 140 may include one or more of gas usage device 140-1, a water usage device 140-2, an electricity usage device 140-3, and a network device 140-4, etc.

In some scenarios, the application scenario 100 may also exclude the monitoring device 140 and obtain the user data directly from the third-party platform. The smart gas terminal 160 may be used to receive the information related to the smart gas terminal management solution to open or close the gas valve, and may also be used to provide feedback on the opening or closing status of the smart gas terminal.

It should be noted that the application scenario 100 is provided for illustrative purposes only and is not intended to limit the scope of the present disclosure. For those skilled in the art, there are a variety of modifications or variations that can be made based on the description of the present disclosure. For example, the application scenario 100 may also include a database. As another example, the application scenario 100 may be implemented on other devices to achieve similar or different functionality. However, variations and modifications will not depart from the scope of the present disclosure.

The Internet of Things system is an information processing system that includes part or all of a user platform, a service platform, a management platform, a sensor network platform, and an object platform. The user platform is a functional platform to realize the obtaining of perceptual information and the generation of control information of the user. The service platform may realize a connection between the management platform and the user platform, and play a function of perceiving an information service communication and controlling an information service communication. The management platform may realize the harmonization and coordination of the connection and collaboration among various functional platforms (such as the user platform and the service platform). The management platform converges information of the Internet of Things operation system and may provide a function of perceptual management and control management for the Internet of Things operation system. The service platform may realize a connection between the management platform and the object platform, and play a function of perceiving an information service communication and controlling an information service communication. The user platform is a functional platform to realize the obtaining of perceptual information and the generation of control information of the user.

The processing of information in the Internet of Things system may be divided into a processing process of perceptual information and a processing process of control information of the user. The control information may be information generated based on the perceptual information of the user. In some embodiments, the control information may include user demand control information, and the perceptual information of the user may include user query information. The perceptual information may be obtained by the object platform and transmitted to the management platform through the sensor network platform. The user demand control information may be transmitted from the management platform to the user platform through the service platform, which in turn enables a control of prompt message sending.

Figure 2:
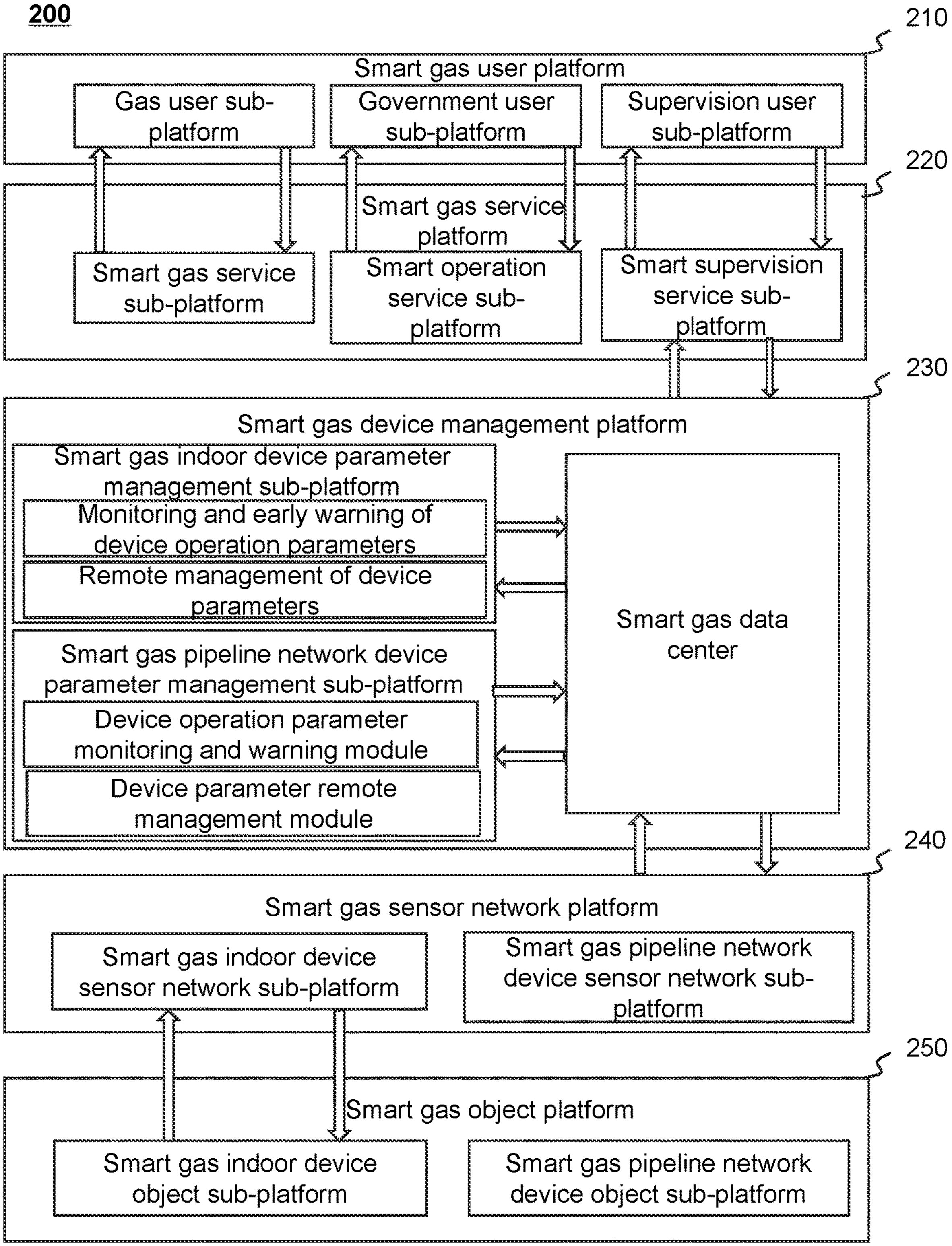
FIG. 2 is an exemplary schematic diagram illustrating an Internet of Things system for smart gas terminal management according to some embodiments of the present disclosure.

FIG. 2 is an exemplary schematic diagram illustrating an Internet of Things system for smart gas terminal management according to some embodiments of the present disclosure.

As shown in FIG. 2, the Internet of Things system 200 for smart gas terminal management may include a smart gas user platform 210, a smart gas service platform 220, a smart gas device management platform 230, a smart gas sensor network platform 240, and a smart gas object platform 250.

In some embodiments, the Internet of Things system 200 for smart gas terminal management may be part of or implemented by a server.

In some embodiments, the Internet of Things system 200 for smart gas terminal management may be applied to a variety of scenarios of terminal management. In some embodiments, the Internet of Things system 200 for smart gas terminal management may obtain a query instruction based on a query demand for the opening or closing status of the smart gas terminal sent by a supervision user, and obtain a query result based on the query instruction. In some embodiments, the Internet of Things system 200 for smart gas terminal management may obtain user data authorized for usage by a user, wherein the user data includes at least one of gas information, water usage information, electricity usage information, and network information; determine, based on the user data, residence information of the user; and determine, based on the residence information, a smart gas terminal management solution.

The multiple scenarios of the Internet of Things system 200 for smart gas terminal management may include residential scenarios as well as industrial scenarios, which may be used as a gas terminal management scenario involving gas supply for residential fuels, commercial fuels, industrial fuels, raw materials for craft industrial production, etc. It should be noted that the above scenarios are only examples and do not limit the specific application scenarios of the Internet of Things system 200 for smart gas terminal management, and those skilled in the art may apply the Internet of Things system 200 for smart gas terminal management to any other suitable scenarios based on the content disclosed in this embodiment.

The smart gas user platform 210 may be a user-driven platform for obtaining user demand as well as providing feedback on information to the user. In some embodiments, the smart gas user platform 210 may interact with the user. In some embodiments, the smart gas user platform 210 may be configured as a terminal device, for example, a smart device such as a cell phone and a computer.

In some embodiments, the smart gas user platform 210 may include a gas user sub-platform, a government user sub-platform, and a supervision user sub-platform. A gas user may receive information related to the smart gas terminal management solution sent by the smart gas service platform 220 through the gas user sub-platform, or interact with the smart gas service platform 220 to send confirmation information related to the smart gas terminal management solution; a government user may obtain a gas operation service from the smart gas service platform 220 through the government user sub-platform; a supervision user may send a query instruction or control instruction for the opening or closing status of the smart gas terminal to the smart gas service platform 220 through the supervision user sub-platform.

The gas user may be a user of gas device, the government user may be a government manager related to activities such as gas facility protection, gas safety accident prevention and treatment, or gas operation and management, and the supervision user may be a manager or government employee of gas device and gas system safety monitoring.

In some embodiments, the smart gas user platform 210 may, through the terminal device, obtain an input instruction of the user to query the information related to the opening or closing status of the smart gas terminal. In some embodiments, the smart gas user platform 210 may obtain the confirmation information of the user associated with the smart gas terminal management solution through the terminal device.

The smart gas service platform 220 may be a platform that provides information/data transfer and interaction.

In some embodiments, the smart gas service platform 220 may be used for the interaction of information and/or data between the smart gas device management platform 230 and the smart gas user platform 210.

For example, the smart gas service platform 220 may receive the query instruction sent by the smart gas user platform 210, store and process the query instruction, and then send the query instruction to the smart gas device management platform 230, as well as obtain the information related to the opening or closing status of the smart gas terminal from the smart gas device management platform 230, store and process the information, and then send the information to the smart gas user platform 210.

As another example, the smart gas service platform 220 may send the smart gas terminal management solution to the smart gas user platform 210, as well as obtain the confirmation information related to the smart gas terminal management solution from the smart gas user platform 210, store and process the confirmation information, and then send the confirmation information to the smart gas device management platform 230.

In some embodiments, the smart gas service platform 220 may include a smart gas service sub-platform, a smart operation service sub-platform, and a smart supervision service sub-platform. In some embodiments, the smart gas service sub-platform may be used to receive the information related to the smart gas terminal management solution sent by the smart gas device management platform 230 and send the information to the gas user sub-platform.

In some embodiments, the smart supervision service sub-platform may be used to receive the query instruction sent by the government user sub-platform and send the query instruction to the smart gas device management platform 230. In some embodiments, the smart supervision service sub-platform may be used to receive the control instruction sent by the supervision user sub-platform and send the control instruction to the smart gas device management platform 230.

The smart gas device management platform 230 may refer to the Internet of Things (IoT) platform that harmonizes and coordinates the connection and collaboration between functional platforms and provides perceptual management and control management.

In some embodiments, the smart gas device management platform 230 may be used for information and/or data processing. For example, the smart gas device management platform 230 may be used for the monitoring and early warning of device operation parameters and remote management of device parameters, etc.

In some embodiments, the smart gas device management platform 230 may also be used for the interaction of information and/or data between the smart gas service platform 220 and the smart gas sensor network platform 240.

For example, the smart gas device management platform 230 may receive the query instruction sent by the smart gas service platform 220 (e.g., the smart supervision service sub-platform), store and process the query instruction, and then send the query instruction to the smart gas sensor network platform 240, as well as obtain the information related to the opening or closing status of the smart gas terminal from the smart gas sensor network platform 240, store and process the information, and then send the information to the smart gas service platform 220.

As another example, the smart gas device management platform 230 may send the information related to the smart gas terminal management solution to the smart gas service platform 220 (e.g., the smart gas service sub-platform), obtain the confirmation information related to the smart gas terminal management solution, and send the confirmation information to the smart gas sensor network platform 240 after processing.

In some embodiments, the smart gas device management platform 230 may include a smart gas indoor device parameter management sub-platform, a smart gas pipeline network device parameter management sub-platform, and a smart gas data center.

The smart gas indoor device parameter management sub-platform may be used for remote management and parameter monitoring and early warning of the smart gas indoor device. In some embodiments, the smart gas indoor device parameter management sub-platform may include a device operation parameter monitoring and warning module as well as a device parameter remote management module.

The smart gas pipeline network device parameter management sub-platform may be used for remote management and parameter monitoring and early warning of the smart gas pipeline network device. In some embodiments, the smart gas pipeline network device parameter management sub-platform may include a device operation parameter monitoring and warning module as well as a device parameter remote management module.

The smart gas data center may be a data management sub-platform that stores, calls, and transfers data. The smart gas data center may store historical data, for example, historical user data, etc. The above data may be obtained by manual input or historical execution of this method. In some embodiments, the smart gas data center may be used to send the smart gas terminal management solution to the smart gas service platform 220.

In some embodiments, the smart gas device management platform 230 may be used to obtain user data authorized for usage by a user, wherein the user data includes at least one of gas information, water usage information, electricity usage information, and network information; determine, based on the user data, residence information of the user; and determine, based on the residence information, a smart gas terminal management solution. For more information about determining the smart gas terminal management solution, please refer to FIG. 3 and related descriptions thereof.

In some embodiments, the smart gas device management platform 230 may further be used to: determine the residence information through a residence information determination model based on the user data, wherein the residence information determination model is a machine learning model. For more information about the residence information determination model, please refer to FIG. 4 and related descriptions thereof.

In some embodiments, the smart gas device management platform 230 may further be used to: determine, based on the residence information, whether the user is resident or not; predict, in response to the user not being resident, a return residence time of the user; and determine the smart gas terminal management solution based on the return residence time. For more information about the determining the smart gas terminal management solution, please refer to FIG. 5 and related descriptions thereof.

In some embodiments, the smart gas device management platform 230 may further be used to: determine, based on the residence information, whether the user is resident or not; obtain user physical information authorized by the user in response to the user not being resident; monitor whether the user is resident in a future time period based on the user physical information; and open the smart gas terminal in response to the user being resident in the future time period. For more information about determining the opening and closing of the smart gas terminal, please refer to FIG. 6 and related descriptions thereof.

For more information about the smart gas device management platform 230, please refer to FIGS. 3-6 and related descriptions thereof.

The smart gas sensor network platform 240 may refer to a platform that unifies the management of sensor communications among the platforms in the Internet of Things system 200. In some embodiments, the smart gas sensor network platform 240 may be configured as a communication network and gateway. In some embodiments, the smart gas sensor network platform 240 may include a smart gas indoor device sensor network sub-platform as well as a smart gas pipeline network device sensor network sub-platform. The smart gas sensor network platform 240 may use multiple groups of gateway servers, or multiple groups of smart routers, without too much limitation here.

In some embodiments, the smart gas sensor network platform 240 may be used for sensor communication of the smart gas indoor device and sensor communication of the smart gas pipeline network device. In some embodiments, the smart gas sensor network platform 240 may be used to send the user data to the smart gas data center. In some embodiments, the smart gas sensor network platform 240 may be used to send the smart gas terminal management solution from the smart gas data center to the smart gas terminal.

The smart gas object platform 250 may be a functional device with a practical use. In some embodiments, the smart gas object platform 250 may be configured as a smart gas terminal, for example, a gas-using device, a smart gas meter, etc. In some embodiments, the smart gas object platform 250 may be configured as other terminals, for example, an electricity meter, a water meter, a computer, etc. The smart gas object platform 250 may obtain user data, wherein the user data includes at least one of gas information, water usage information, electricity usage information, and network information. In some embodiments, the smart gas object platform 250 may send the user data to the smart gas device management platform 230 via the smart gas sensor network platform 240. In some embodiments, the smart gas object platform 250 may include a smart gas indoor device object sub-platform and a smart gas pipeline network device object sub-platform. The smart gas indoor device object sub-platform may be configured as a terminal that may be used by the indoor user, such as a gas stove, a gas water heater, a gas meter, an electric meter, a water meter, a computer, etc. The smart gas pipeline network device object sub-platform may be configured as a gas pipeline, a gas station, etc.

In some embodiments of the present disclosure, with the above system, the opposability between different types of data can be ensured, and the classification of data transmission, traceability, and the classification issuing and processing of instructions can be ensured, making the Internet of Things structure and data processing clear and controllable, and facilitating the control and data processing of the Internet of Things.

Figure 3:
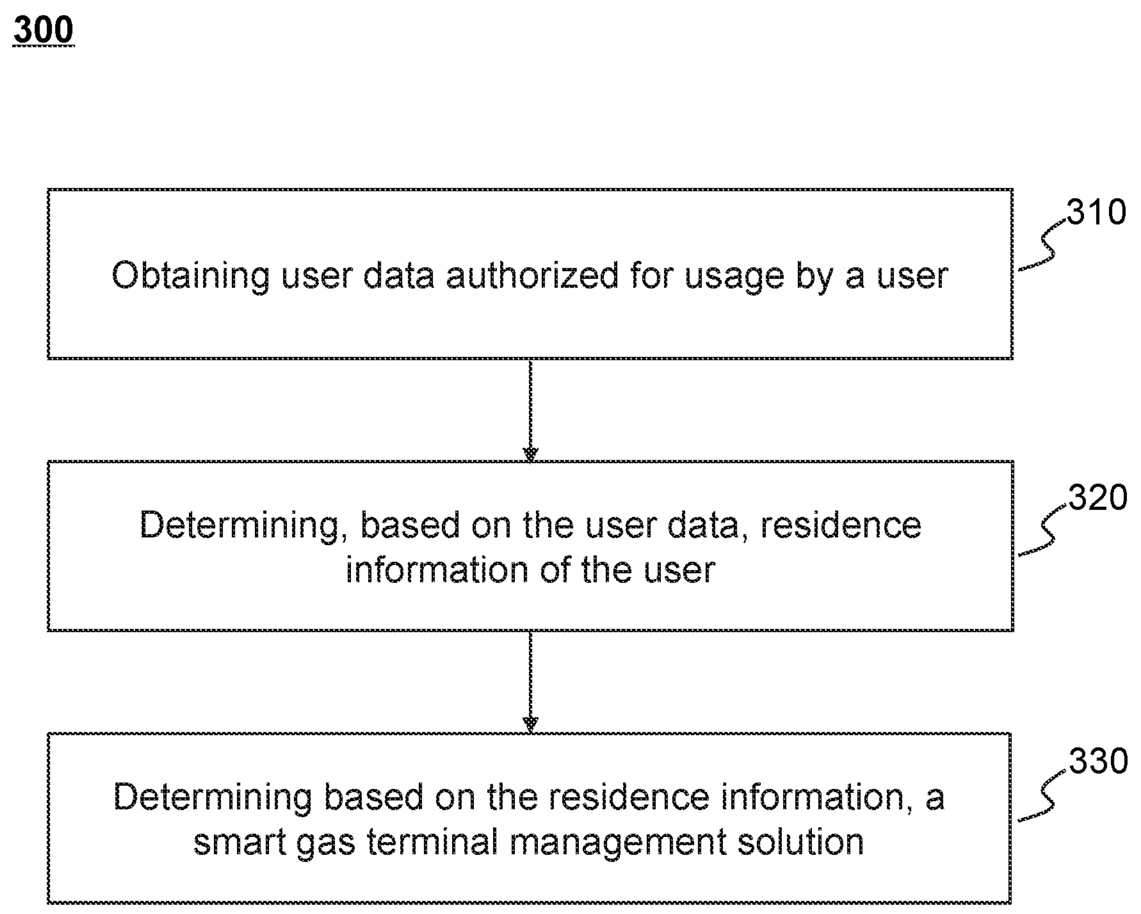
FIG. 3 is a flowchart illustrating an exemplary method for smart gas terminal management according to some embodiments of the present disclosure.

FIG. 3 is a flowchart illustrating an exemplary method for smart gas terminal management according to some embodiments of the present disclosure. In some embodiments, process 300 may be performed by the smart gas device management platform of the Internet of Things system for smart gas terminal management. As shown in FIG. 3, the process 300 includes the following steps.

Step 310, obtaining user data authorized for usage by a user.

In some embodiments of the present disclosure, the gas may be a gaseous fuel for residential and industrial business usage. Exemplary gas may include natural gas, liquefied petroleum gas, coal gas, etc. The user data may be usage data for each indoor terminal connected to the Internet of Things system of the user.

In some embodiments, the user data may include at least one of gas information, water usage information, electricity usage information, and network information. The gas information may include a daily gas usage amount, a gas type, a gas usage route, etc. The water usage information may include a daily water usage amount, a water usage route, etc. The electricity usage information may include a daily electricity usage amount, an electricity usage route, etc. The network information may include a daily flow usage amount, a network terminal type, etc.

In some embodiments, the user data may be obtained through various indoor terminals that are connected to the Internet of Things system. For example, the smart gas object platform may obtain the gas information through a gas stove and a gas meter; the water usage information is obtained through a water meter; the electricity usage information is obtained through an electricity meter; the network information is obtained through a computer, etc. After obtaining the above information, the smart gas object platform may send the above information to the smart gas device management platform through the smart gas sensor network platform.

In some embodiments, the user data may be authorized for usage by a user. For example, the smart gas user platform may send an obtaining request of the user data to the user and respond to a user consent request to obtain the user data.

Step 320, determining, based on the user data, residence information of the user.

The residence information may be information related to the living and traveling of the user. The residence information may include whether the user lives, travel time, home time, and usage time of the gas terminal. In some embodiments, the residence information may be obtained through a user input, or through a fitting calculation, an artificial intelligence prediction, etc. For example, the residence information may be determined by looking up a preset table of relationships between the user data and the residence information based on the user data.

In some embodiments, when one or more of the user data does not meet a residence condition, the corresponding residence information may be determined to be not resident. For example, when one or more of the daily gas usage amount less than 0.001 $m^3$, the daily water usage amount less than 0.001 $m^3$, the daily electricity usage amount less than 1 kWh, and the daily flow usage amount less than 1M are met, the corresponding residence information is determined to be not resident.

In some embodiments, the residence information may be determined by a residence information determination model. For more information about the residence information determination model, please refer to FIG. 4 and related descriptions thereof.

Step 330, determining, based on the residence information, a smart gas terminal management solution.

The smart gas terminal management solution may be a solution to control the smart gas terminal. The smart gas terminal management solution may include whether the gas terminal is opened and an opening time.

In some embodiments, the smart gas terminal management solution further includes an opening time of the smart gas terminal. In some embodiments, the smart gas terminal management solution may be determined by a table lookup based on preset relationships with the residence information. For example, when the residence information of the user is that the user is not resident, the smart gas terminal management solution may be to remotely control the gas meter main valve to close; and when the residence information of the user is that the user is resident, then the smart gas terminal management solution may be to open the gas terminal.

In some embodiments, the smart gas terminal management solution may be determined by further processing of the residence information. For more information about the smart gas terminal management solution, please refer to FIGS. 5 and 6 and related descriptions thereof.

The method for smart gas terminal management described in some embodiments of the present disclosure enables the smart management of gas terminals to improve convenience of the user while avoiding the safety hazards of terminals opening for a long time periods.

Figure 4:
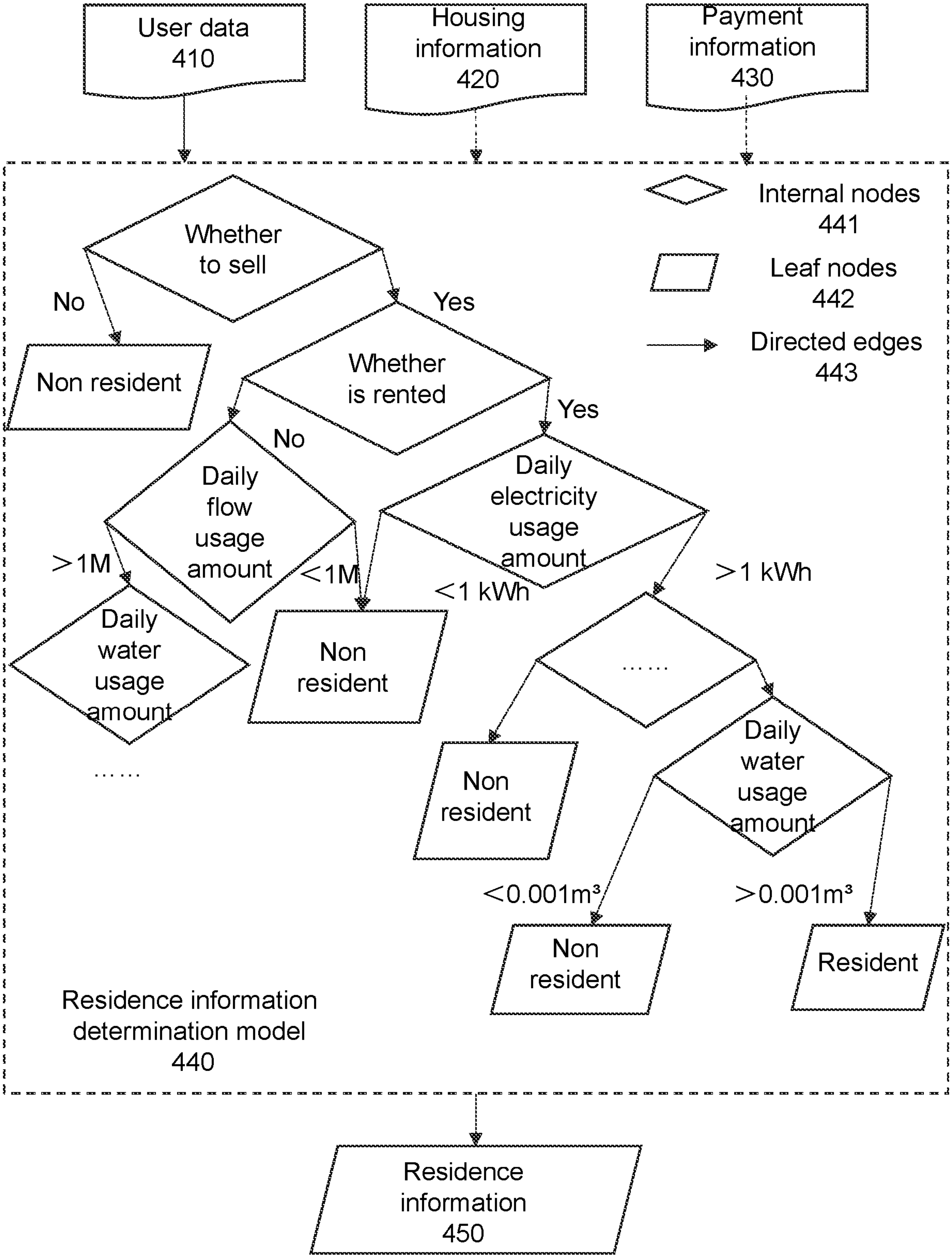
FIG. 4 is a schematic diagram illustrating a residence information determination model according to some embodiments of the present disclosure.

FIG. 4 is a schematic diagram illustrating a residence information determination model according to some embodiments of the present disclosure.

In some embodiments, the smart gas device management platform may determine residence information 450 based on user data 410 by a residence information determination model 440, wherein the residence information determination model 440 is a machine learning model. Exemplary machine learning model may include a neural network model, a deep neural network model, etc. The input of the residence information determination model 440 may include the user data 410 and the output may include the residence information 450. Exemplary user data 410 may include at least one of gas information, water usage information, electricity usage information, network information. Exemplary residence information 450 may include both resident and non-resident.

In some embodiments, the residence information determination model 440 may be obtained by training a large number of first training samples with labels. Specifically, a plurality of groups of first training samples with labels may be input to an initial residence information determination model, a loss function may be constructed based on the output of the initial residence information determination model and the labels, and parameters of the residence information determination model may be updated through training based on iterations of the loss function.

In some embodiments, the training may be performed by various methods based on the first training samples. For example, the training may be performed based on a gradient descent method. When a preset condition is met, the training may be end and the trained residence information determination model may be obtained. The preset condition may be a loss function convergence.

In some embodiments, the first training samples may include historical user data. For example, at least one of historical gas information, historical water usage information, historical electricity usage information, and historical network information. The labels may be corresponding residence information (e.g., resident and non-resident, which may be indicated by 0 and 1). The first training sample may be determined by retrieving the historical information stored in the smart gas data center (storage device). The labels may be obtained by manual annotation.

In some embodiments, the input of the residence information determination model 440 also includes housing information 420 of the user. The housing information may be information that reflects the condition of the house. For example, whether the house is for rent, whether the house is for sale, whether the house is a residence or an apartment, etc. The housing information may be determined by obtaining house record registration information from the Internet.

In some embodiments, the input of the residence information determination model 440 also includes payment information 430 of the user. The payment information may be information that reflects the payment of fees by the user. For example, whether gas, water and electricity bills are paid. The payment information may be determined by obtaining relevant statistical information from the payment platform from the Internet. In some embodiments, the first training sample of the residence information determination model 440 also includes historical housing information and historical payment information.

In some embodiments, the residence information determination model 440 may be a decision tree model. The decision tree model may be a tree model used to determine the residence information. The decision tree represents a classification result of the user data in a tree-like structure, and the decision tree includes nodes and directed edges. The nodes may represent features, attributes, or types, and the nodes may include internal nodes 441 and leaf nodes 442. The internal nodes may be nodes that represent features, attributes. The leaf nodes may be nodes that represent types. The directed edges 443 may represent a division of node types.

In some embodiments, a hierarchical relationship (i.e., parent-child relationship) may exist between a plurality of internal nodes. For example, if internal node A has a higher hierarchy and internal node B has an adjacent lower hierarchy, the internal node A may be said to be the parent of the internal node B, or the internal node B may be a child of internal node A.

For example, as shown in FIG. 4, "whether to sell", "whether to rent", "whether the daily electricity usage amount is greater than 1 kWh", "whether the daily water usage amount is greater than 0.001 $m^3$", "whether the daily flow usage amount is greater than 1M" may be the internal nodes of the decision tree. "non-resident" and "resident" may be leaf nodes of the decision tree. The node "whether to sell" may be the parent node of the node "whether to rent", and the node "whether to rent" may be the child node of the node "whether to sell". The division of each node meeting the condition and not meeting the condition may be the directed edge. Exemplarily, the user data, the housing information, and the payment information may be input into the decision tree model. For a first internal node (i.e., a root node) "whether to sell", the decision tree model may determine that the user is not resident when the condition is not met (i.e., not sold); the decision tree model may proceed to a next internal node "whether to rent" and makes a judgment when the condition is met (i.e., sold). When the condition is not met (i.e., not rented), the decision tree model may proceed to a next internal node "whether the daily flow usage amount is greater than 1M"; when the condition is met (i.e., rented), the decision tree model may proceed to a next internal node "whether the daily electricity usage amount is greater than 1 kWh", etc. After the decision tree model enters a lowest level and makes a judgment, the decision tree model may output the residence information. For example, as shown in FIG. 4, the internal node "whether the daily water usage amount is greater than 0.001 $m^3$" is judged, and when the condition is not met, the residence information may be output as "non-resident"; when the condition is met, the residence information may be output as "resident". In some embodiments, when the decision tree is judged for each internal node, the residence information corresponding to the user data may be output.

It should be noted that the above nodes are intended to be illustrative and do not imply a limit on the content or count of nodes. For those skilled in the art, deletions and additions on the nodes or modifications on the content of the nodes may be made based on the principles of the present disclosure. Those deletions, additions, and modifications do not depart from the scope of the present disclosure.

In some embodiments, the decision tree model may be obtained by sample training. Exemplary decision tree training algorithm may include ID3 (Iterative Dichotomiser 3), CART (Classification and Regression Tree), etc. The sample may be the historical user data, the historical housing information, and the historical payment information. The training process of the decision tree model may include a feature selection, a decision tree generation, and a pruning process.

The feature selection may be a selection of the features on which the nodes are classified. In some embodiments, the feature selection may prioritize features with high information gain, i.e., prioritize features that may classify all training samples as much as possible. For example, in the gas information in the user data, the daily gas usage amount is chosen as the feature instead of the gas usage route, because each user data may be classified by the daily gas usage amount, but not necessarily by the gas usage route (e.g., it may contain gas usage routes outside the range of the feature).

In some embodiments, the feature selection process may assign an information gain value to each feature. The larger the information gain value, the greater the likelihood of the feature being selected. For example, the information gain value may be a percentage such as 60%, 80%, etc. The information gain value of each feature may be determined by manual annotation.

The generation of the decision tree may be a recursive process. In some embodiments, the feature with the largest information gain value may be used as the first internal node (i.e., the root node) for classification, and other internal nodes (i.e., child nodes) may be constructed based on the classification result of the root node. The features corresponding to the other internal nodes may be divided in a hierarchy based on the order of the magnitude of the information gain values. For example, if the information gain value of the feature "whether to rent" is greater than that of the feature "daily electricity usage amount is greater than 1 kWh", then the feature "daily electricity usage amount is greater than 1 kWh" may be used as a higher level and the feature "whether to rent" may be used as a lower level. That is, the feature "daily electricity usage amount is greater than 1 kWh" may be used as a child node of the feature "whether to rent" (as shown in FIG. 4). The generation process of the decision tree may end when all user data is classified.

The pruning process may be a process of optimization of the decision tree. Specifically, the pruning process may remove leaf nodes that are too subdivided and return to the previous node, which is then used as the new leaf node. In some embodiments, when the information gain value of a feature is less than a preset information gain threshold, the node corresponding to the feature may be removed. The preset information gain threshold may be determined empirically.

Classify the user data through the decision tree model, which enables smart determination of whether the user is resident or not. In addition, the decision tree model may realize the judgment logic of classifying first based on important features and then based on minor features by determining the importance of features by the information gain value of each feature. The decision tree model is further optimized by the pruning process to avoid duplicate classification as well as invalid classification and to improve the efficiency of the model output.

Figure 5:
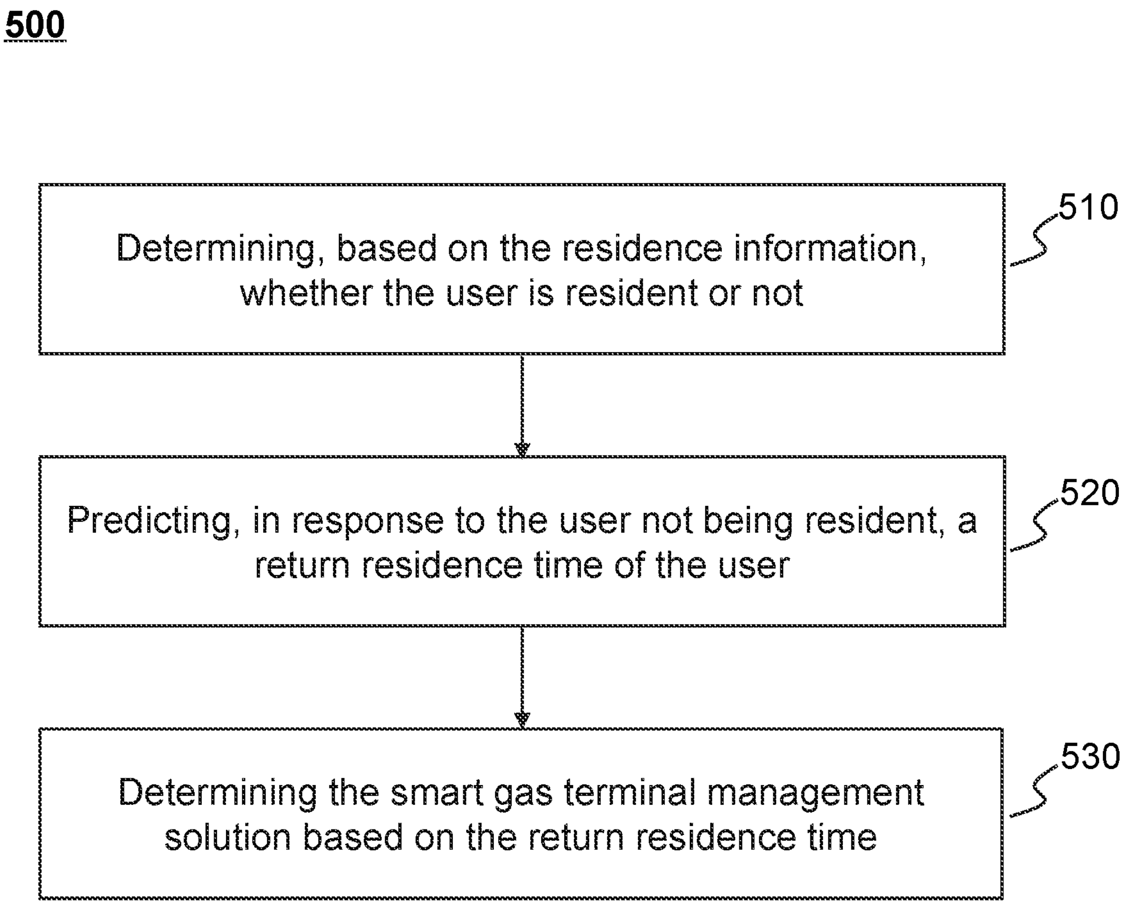
FIG. 5 is a flowchart illustrating an exemplary process for determining a smart gas terminal management solution according to some embodiments of the present disclosure.

FIG. 5 is a flowchart illustrating an exemplary process for determining a smart gas terminal management solution according to some embodiments of the present disclosure. In some embodiments, process 500 may be performed by the smart gas device management platform of the Internet of Things system for smart gas terminal management. As shown in FIG. 5, the process 500 includes the following steps.

Step 510, determining, based on the residence information, whether the user is resident or not.

As explained above, the residence information may include whether the user is resident or not, and is not repeated here.

Step 520, predicting, in response to the user not being resident, a return residence time of the user.

In some embodiments, the return residence time of the user may be determined by a mathematical fitting calculation, artificial intelligence, and other methods.

In some embodiments, the gas device management platform may determine, based on the user data, a current feature vector; determine a feature vector that meets a preset relationship with the current feature vector from a feature vector pool as a reference feature vector; and determine the return residence time based on the current feature vector and the reference feature vector.

The current feature vector may characterize a certain group of user data. The elements of the current feature vector may include gas information, water usage information, electricity usage information, network information, etc., in the user data. For example, the current feature vector may be that:

$\vec{1}$=(daily gas usage amount, daily water usage amount, daily electricity usage amount, daily flow usage amount)

The feature vector pool may store a plurality of historical feature vectors corresponding to historical user data, as well as historical return residence times corresponding to historical feature vectors. When the current feature vector and one or more historical feature vectors meet a preset relationship, the historical feature vector may be used as a reference feature vector. The preset relationship may include that a Euclidean distance between the current feature vector and a certain historical feature vector is minimal or less than a preset distance threshold.

In some embodiments, the preset relationship may also be that the weighted distance between the current feature vector and a particular historical feature vector is minimal or less than a preset distance threshold. Each element of the current feature vector may be weighted with each element of a certain historical feature vector, and the weight may be the information gain value of the feature corresponding to each element. For example, the current feature vector is that:

$\vec{1}$=(daily gas usage amount of 0.001 $m^3$, daily water usage amount of 0.05 $m^3$, daily electricity usage amount of 1.1 kWh), a certain historical feature vector in the feature vector database is:

$\vec{m}$=(gas usage amount of 0.001 $m^3$, water usage amount of 0.05 $m^3$, electricity usage amount of 1.1 kWh), the distance between the above two vectors may be calculated by the following equation:

$$S=\sqrt{W_1*(0.001-0.015)^2+W_2*(0.05-0.10)^2+W_3*(1.1-3.3)^2}$$

where S denotes the distance between the two vectors; $W_1$ denotes the information gain value of the daily gas usage amount; $W_2$ denotes the information gain value of the daily water usage amount; and $W_3$ denotes the information gain value of the daily electricity usage amount. The above information gain values may be determined by manual input. The smart gas terminal management platform may calculate the aforementioned distance between the current feature vector and each historical feature vector, and select the historical feature vector with the smallest weighted distance, or with the weighted distance less than a preset distance threshold from calculation results as the reference feature vector meeting the preset relationship.

By introducing information gain values in the vector distance, the contribution degree of the feature corresponding to each element in the feature vector can be reflected, which can increase the influence of features with large information gain values, decrease the influence of features with small information gain values, and make the prediction result more accurate.

In some embodiments, the gas device management platform may use the historical return residence time corresponding to the reference feature vector as the return residence time corresponding to the current feature vector. In some embodiments, the gas device management platform may use the average of the historical return residence times corresponding to the plurality of reference feature vectors as the return residence time corresponding to the current feature vector.

Step 530, determining the smart gas terminal management solution based on the return residence time.

In some embodiments, the smart gas terminal management solution may also include the management of opening and closing of the gas terminal at future times. For example, the gas device management platform may open the gas terminal when a predicted return residence time is reached.

In some embodiments, the gas device management platform may send the return residence time to the user; and confirm the opening time of the smart gas terminal to the user. The gas device management platform may determine whether the predicted return residence time is appropriate to the user and determine an actual opening time of the gas terminal based on feedback from the user.

Some embodiments of this present disclosure facilitate the comparison of current user data with historical user data by transforming cluttered user data into feature vectors; in addition, the opening and closing of the gas terminal can be controlled by the predicted return residence time, improving convenience of the user.

Figure 6:
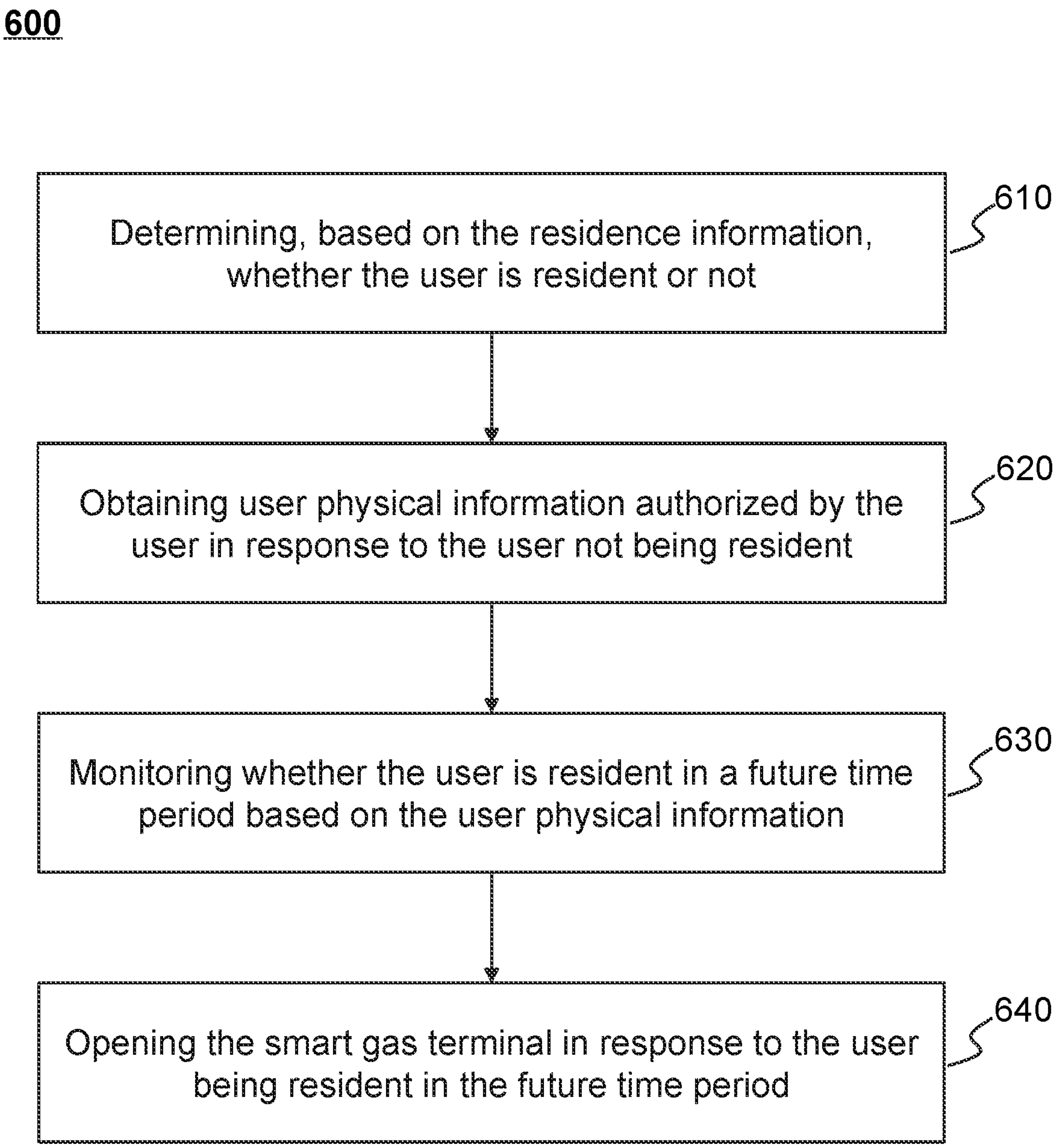
FIG. 6 is a flowchart illustrating an exemplary process for controlling an opening and a closing of a gas terminal according to some embodiments of the present disclosure.

FIG. 6 is a flowchart illustrating an exemplary process for controlling an opening and a closing of a gas terminal according to some embodiments of the present disclosure. In some embodiments, process 600 may be performed by the smart gas device management platform of the Internet of Things system for smart gas terminal management. As shown in FIG. 6, the process 600 includes the following steps.

Step 610, determining, based on the residence information, whether the user is resident or not.

As explained above, the residence information may include whether the user is resident or not, and is not repeated here.

Step 620, obtaining user physical information authorized by the user in response to the user not being resident.

The user physical information may include information of the user such as facial information, gait information, voice information, etc. In some embodiments, the user physical information may be obtained through the remote terminal of the user, or through automatic collection while the user is resident. In some embodiments, the user physical information may be obtained with the authorization of the user. For example, a collection request may be sent to the user before the user physical information is collected, and the collection is performed based on the authorization of the user.

Step 630, monitoring whether the user is resident in a future time period based on the user physical information.

In some embodiments, the Internet of Things system for smart gas terminal management may be connected to a network of indoor/outdoor camera. The camera may determine whether the user is resident by comparing a captured image with the user physical information.

Step 640, opening the smart gas terminal in response to the user being resident in the future time period.

Exemplarily, the gas device management platform may automatically open the smart gas terminal while the user is resident or prior to the residence, reducing user operations.

The Internet of Things system for smart gas terminal management in some embodiments of the present disclosure is connected to other terminals through the network, which can realize the linkage of multiple terminals in the Internet of Things and improve the user experience.

The present disclosure provides a non-transitory computer-readable storage medium, comprising a set of instructions, wherein when executed by a processor, a method for smart gas terminal management is implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for smart gas terminal management, wherein the method is performed by a smart gas device management platform of an Internet of Things system for smart gas terminal management, the Internet of Things system for smart gas terminal management further includes a smart gas user platform, a smart gas service platform, a smart gas sensor network platform, and a smart gas object platform, the smart gas object platform is used to obtain user data, the smart gas sensor network platform is used to send the user data to the smart gas device management platform, the smart gas service platform is used to send a smart gas terminal management solution to the smart gas user platform, and the smart gas user platform is used to interact with a user, the smart gas user platform includes a gas user sub-platform, a government user sub-platform, and a supervision user sub-platform; the smart gas service platform includes a smart gas service sub-platform, a smart operation service sub-platform, and a smart supervision service sub-platform, the smart gas device management platform includes a smart gas indoor device parameter management sub-platform, a smart gas pipeline network device parameter management sub-platform, and a smart gas data center, the smart gas sensor network platform includes a smart gas indoor device sensor network sub-platform and a smart gas pipeline network device sensor network sub-platform, and the smart gas object platform includes a smart gas indoor device object sub-platform and a smart gas pipeline network device object sub-platform; the method comprising:

obtaining the user data authorized for usage by the user, wherein the user data includes at least one of gas information, water usage information, electricity usage information, and network information;

determining, based on the user data, residence information of the user; and determining, based on the residence information, the smart gas terminal management solution.

2. The method of claim 1, wherein the determining, based on the user data, residence information of the user includes:

determining the residence information through a residence information determination model based on the user data, wherein the residence information determination model is a machine learning model.

3. The method of claim 2, wherein the residence information determination model is a decision tree model, and an input of the residence information determination model further includes housing information of the user.

4. The method of claim 3, wherein the input of the residence information determination model further includes payment information of the user.

5. The method of claim 1, wherein the determining, based on the residence information, the smart gas terminal management solution includes:

determining, based on the residence information, whether the user is resident or not;

predicting, in response to the user not being resident, a return residence time of the user; and determining the smart gas terminal management solution based on the return residence time.

6. The method of claim 5, wherein the predicting, in response to the user not being resident, a return residence time of the user includes:

determining a current feature vector based on the user data;

determining a feature vector that meets a preset relationship with the current feature vector from a feature vector pool as a reference feature vector; and determining the return residence time based on the current feature vector and the reference feature vector.

7. The method of claim 5, wherein the smart gas terminal management solution includes a time of opening the smart gas terminal, and the determining, based on the residence information, the smart gas terminal management solution includes:

sending the return residence time to the user; and confirming the time of opening the smart gas terminal to the user.

8. The method of claim 1, wherein the smart gas terminal management solution further includes whether to open the smart gas terminal, and the determining, based on the residence information, the smart gas terminal management solution includes:

determining, based on the residence information, whether the user is resident or not;

obtaining user physical information authorized by the user in response to the user not being resident;

monitoring whether the user is resident in a future time period based on the user physical information; and opening the smart gas terminal in response to the user being resident in the future time period.

9. An Internet of Things system for smart gas terminal management, wherein the Internet of Things system for smart gas terminal management comprises a smart gas user platform, a smart gas service platform, a smart gas sensor network platform, a smart gas object platform, and a smart gas device management platform, wherein the smart gas object platform is used to obtain user data authorized for usage by a user; the user data includes at least one of gas information, water usage information, electricity usage information, and network information;

the smart gas sensor network platform is used to send the user data to the smart gas device management platform;

the smart gas device management platform is used to:

determine, based on the user data, residence information of the user; and determine, based on the residence information, a smart gas terminal management solution;

the smart gas service platform is used to send the smart gas terminal management solution to the smart gas user platform; and the smart gas user platform is used to interact with the user, wherein the smart gas user platform includes a gas user sub-platform, a government user sub-platform, and a supervision user sub-platform;

the smart gas service platform includes a smart gas service sub-platform, a smart operation service sub-platform, and a smart supervision service sub-platform;

the smart gas device management platform includes a smart gas indoor device parameter management sub-platform, a smart gas pipeline network device parameter management sub-platform, and a smart gas data center;

the smart gas sensor network platform includes a smart gas indoor device sensor network sub-platform and a smart gas pipeline network device sensor network sub-platform; and the smart gas object platform includes a smart gas indoor device object sub-platform and a smart gas pipeline network device object sub-platform.

10. The Internet of Things system of claim 9, wherein the smart gas device management platform is further used to:

determine the residence information through a residence information determination model based on the user data, wherein the residence information determination model is a machine learning model.

11. The Internet of Things system of claim 10, wherein the residence information determination model is a decision tree model, and an input of the residence information determination model further includes housing information of the user.

12. The Internet of Things system of claim 11, wherein the input of the residence information determination model further includes payment information of the user.

13. The Internet of Things system of claim 9, wherein the smart gas device management platform is further used to:

determine, based on the residence information, whether the user is resident or not;

predict, in response to the user not being resident, a return residence time of the user; and determine the smart gas terminal management solution based on the return residence time.

14. The Internet of Things system of claim 13, wherein the smart gas device management platform is further used to:

determine a current feature vector based on the user data;

determine a feature vector that meets a preset relationship with the current feature vector from a feature vector pool as a reference feature vector; and determine the return residence time based on the current feature vector and the reference feature vector.

15. The Internet of Things system of claim 14, wherein the smart gas terminal management solution includes a time of opening the smart gas terminal, and the determining, based on the residence information, the smart gas device management platform is further used to:

send the return residence time to the user; and confirm the time of opening the smart gas terminal to the user.

16. The Internet of Things system of claim 9, wherein the smart gas terminal management solution further includes whether to open the smart gas terminal, and the smart gas device management platform is further used to:

determine, based on the residence information, whether the user is resident or not;

obtain user physical information authorized by the user in response to the user not being resident;

monitor whether the user is resident in a future time period based on the user physical information; and open the smart gas terminal in response to the user being resident in the future time period.

17. A non-transitory computer-readable storage medium, comprising a set of instructions, wherein when executed by a processor, the method as claimed in claim 1 is implemented.

* * * * *